United States Patent
Yano (10) Patent No.: US 10,742,842 B2
(45) Date of Patent: Aug. 11, 2020

(54) INFORMATION PROCESSING APPARATUS AND AUTHENTICATION METHOD USING THE INFORMATION PROCESSING APPARATUS

(71) Applicant: Shunsuke Yano, Kanagawa (JP)

(72) Inventor: Shunsuke Yano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/351,564

(22) Filed: Mar. 13, 2019

(65) Prior Publication Data
US 2019/0289169 A1 Sep. 19, 2019

(30) Foreign Application Priority Data

Mar. 16, 2018 (JP) .................................. 2018-049366

(51) Int. Cl.
*G06F 15/00* (2006.01)
*H04N 1/44* (2006.01)
*G06F 21/60* (2013.01)

(52) U.S. Cl.
CPC ........... *H04N 1/444* (2013.01); *G06F 21/608* (2013.01); *H04N 1/4413* (2013.01)

(58) Field of Classification Search
CPC ..... H04N 1/444; H04N 1/4413; G06F 21/608
USPC ..................................................... 358/1.14
See application file for complete search history.

(56) References Cited

U.S. PATENT DOCUMENTS

| 2007/0206216 A1 | 9/2007 | Sakagami et al. |
| 2008/0092216 A1* | 4/2008 | Kawano ................. G06F 21/46 726/5 |
| 2011/0228311 A1* | 9/2011 | Oguma ................. G06F 21/305 358/1.14 |
| 2012/0262742 A1 | 10/2012 | Yano et al. |

(Continued)

FOREIGN PATENT DOCUMENTS

| JP | 2007-235713 | 9/2007 |
| JP | 2012-014424 | 1/2012 |

(Continued)

*Primary Examiner* — Mark R Milia
(74) *Attorney, Agent, or Firm* — Oblon, McClelland, Maier & Neustadt, L.L.P.

(57) ABSTRACT

An information processing apparatus and an authentication method performed using the information processing apparatus are provided. An information processing apparatus receives, as authentication information, identification information of a user of an information processing system including the information processing apparatus and an authentication apparatus, converts the authentication information, and controls to execute an authentication process based on the authentication information. The information processing apparatus converts the authentication information to form a readable authentication information by converting a character that cannot be interpreted by the information processing apparatus into a character that can be interpreted by the information processing apparatus. The information processing apparatus executes the authentication process to enable use of the information processing apparatus based on the readable authentication information, when the authentication process to enable use of the information processing system is executed by the authentication apparatus.

7 Claims, 10 Drawing Sheets

(56) References Cited

U.S. PATENT DOCUMENTS

| | | |
|---|---|---|
| 2013/0182279 A1 | 7/2013 | Yano |
| 2014/0173715 A1 | 6/2014 | Yano |
| 2016/0150125 A1 | 5/2016 | Yano |
| 2017/0272446 A1 | 9/2017 | Yano |

FOREIGN PATENT DOCUMENTS

| | | |
|---|---|---|
| JP | 2012-018570 | 1/2012 |
| JP | 2012-027666 | 2/2012 |
| JP | 2012-194773 | 10/2012 |
| JP | 2012-196826 | 10/2012 |
| JP | 2012-223891 | 11/2012 |
| JP | 2012-252624 | 12/2012 |
| JP | 2013-164835 | 8/2013 |
| JP | 2013-239066 | 11/2013 |
| JP | 2014-119865 | 6/2014 |
| JP | 2015-060316 | 3/2015 |
| JP | 2016-100866 | 5/2016 |
| JP | 2017-041090 | 2/2017 |
| JP | 2017-170635 | 9/2017 |
| JP | 2017-170636 | 9/2017 |

\* cited by examiner

| | CHARACTER BEFORE CONVERSION | CHARACTER AFTER CONVERSION |
|---|---|---|
| α | : | - |
| β | @ | % |
| ... | ... | ... |

| USER ID | PASSWORD | E-MAIL ADDRESS | FAX NUMBER | ... |
|---|---|---|---|---|
| user_A | PasswA | userA@mail.XX | YY-456-0001 | ... |
| user_B | PasswB | userB@mail.XX | YY-456-0002 | ... |
| user_C | PasswC | userC@mail.XX | YY-456-0003 | ... |
| ... | ... | ... | ... | ... |

FIG. 8

| USER ID | PASSWORD | E-MAIL ADDRESS | FAX NUMBER | ... |
|---|---|---|---|---|
| user:A | PasswA | userA@mail.XX | YY-456-0001 | ... |
| user:B | PasswB | userB@mail.XX | YY-456-0002 | ... |
| user:C | PasswC | userC@mail.XX | YY-456-0003 | ... |
| ... | ... | ... | ... | ... |

| USER ID INPUT IN STEP S101 | USER ID INPUT IN STEP S201 | CHARACTER BEFORE CONVERSION | CHARACTER AFTER CONVERSION |
|---|---|---|---|
| user:A | user_A | ... | _ |
| ... | ... | @ | % |
| ... | ... | ... | ... |

INFORMATION PROCESSING APPARATUS AND AUTHENTICATION METHOD USING THE INFORMATION PROCESSING APPARATUS

CROSS-REFERENCE TO RELATED APPLICATION

This patent application is based on and claims priority pursuant to 35 U.S.C. § 119(a) to Japanese Patent Application No. 2018-049366, filed on Mar. 16, 2018, in the Japan Patent Office, the entire disclosure of which is hereby incorporated by reference herein.

BACKGROUND

Technical Field

The present disclosure relates to an information processing apparatus and an authentication method performed using the information processing apparatus.

Background Art

In recent years, computerization of information has been promoted, and image processing apparatuses such as printers and facsimiles used for outputting digitized information and scanners used for digitizing documents are indispensable apparatuses. In an office environment, an information processing system in which an information processing apparatus such as a personal computer (PC) or the like and an image processing apparatus such as a multifunction peripheral (MFP) are connected through a network is constructed, and processing such as document management is performed.

In such an information processing system, an authentication process is executed by using a server such as Active Directory (registered trademark) and only authenticated users can use the PC or the MFP.

SUMMARY

Embodiments of the present disclosure described herein provide an information processing apparatus and an authentication method carried out with the information processing apparatus.

An information processing apparatus receives, as authentication information, identification information of a user of an information processing system including the information processing apparatus and an authentication apparatus, converts the authentication information, and controls to execute an authentication process based on the authentication information. The information processing apparatus converts the authentication information to form readable authentication information by converting a character that cannot be interpreted by the information processing apparatus into a character that can be interpreted by the information processing apparatus. The information processing apparatus executes the authentication process to enable use of the information processing apparatus based on the readable authentication information, when the authentication process to enable use of the information processing system is executed by the authentication apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

An embodiment of the present disclosure is described hereinafter with reference to drawings. In the present embodiment, an image processing system in which an image processing apparatus that outputs print such as an MFP or a printer is connected to a server through a network is described.

Figure 1:
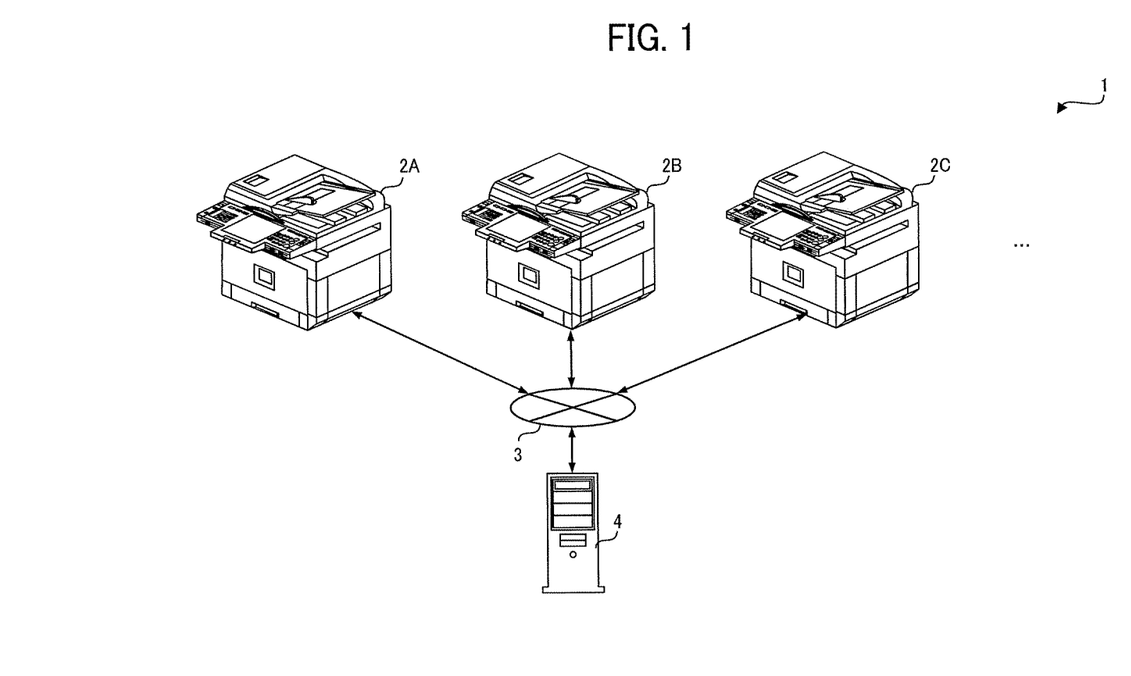
FIG. 1 is a diagram illustrating a configuration of an information processing system according to embodiments of the present disclosure.

FIG. 1 is a diagram illustrating a configuration of an information processing system 1 according to the present embodiment. As illustrated in FIG. 1, the information processing system 1 according to the present embodiment is configured by connecting image processing apparatuses 2A, 2B, and 2C and a server 4 through a network 3. In the following description, the image processing apparatuses 2A, 2B, and 2C are referred to as the image processing apparatus 2 when they are not distinguished. Note that the number of the image processing apparatuses 2 may be more than the number of the image processing apparatuses 2 illustrated in FIG. 1.

The image processing apparatus 2 may be an MFP usable as a printer, a facsimile, a scanner, or a copier, including an imaging function, an image forming function, a communication function, and the like, or an image processing device having only a printer function.

The image processing apparatus 2 also functions as a color printer or a monochrome printer that generates cyan, magenta, yellow, and key (CMYK) or monochrome drawing data based on image data and outputs printed image based on the generated drawing data.

Furthermore, the image processing apparatus 2 is equipped with software for generating document data based on an image read by the scanner. The image processing apparatus 2 exchanges data with other image processing apparatus 2 and the server 4 through the network 3.

The server 4 is a storage device for storing data received through the network 3 and stores authentication information for identifying and authenticating users who are permitted use the information processing system 1. The server 4 stores, as the authentication information, an ID assigned to a user who are permitted use the information processing system 1, a password associated with each ID, and other information capable of recognizing the user.

Figure 2:
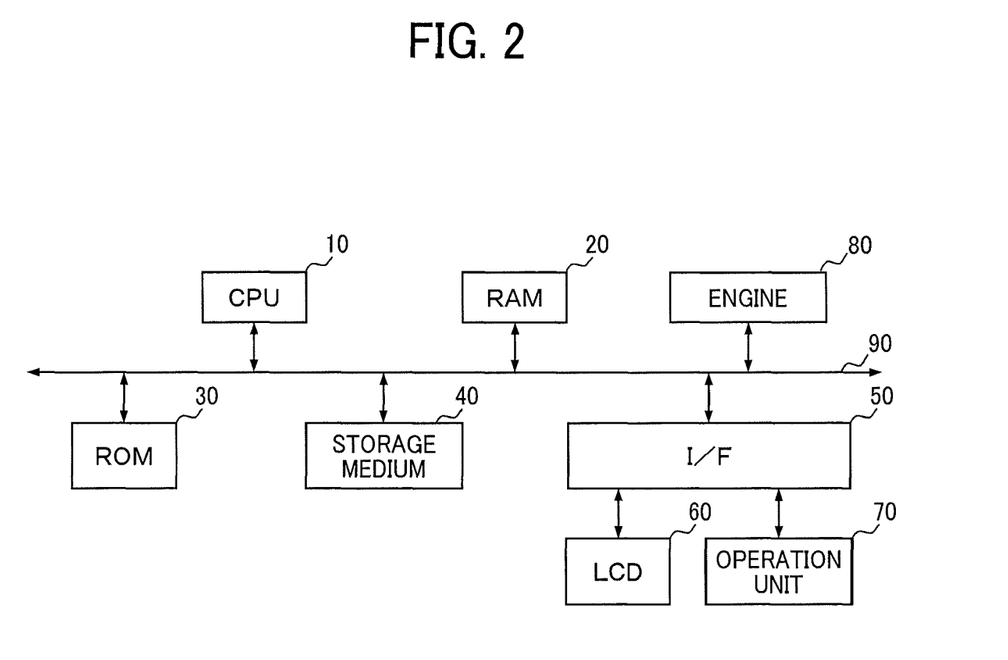
FIG. 2 is a block diagram illustrating a hardware configuration of an image processing apparatus according to embodiments of the present disclosure.

Hereinafter, a hardware configuration of the image processing apparatus 2 according to the present embodiment is described with reference to FIG. 2. FIG. 2 is a block diagram illustrating the hardware configuration of the image processing apparatus 2 according to the present embodiment.

The image processing apparatus 2 according to the present embodiment has the same configuration as an information processing apparatus such as a general PC and the server 4. That is, the image processing apparatus 2 according to the present embodiment includes a central processing unit (CPU) 10, a random access memory (RAM) 20, a read only memory (ROM) 30, a storage medium 40 such as a hard disk drive (HDD), and an interface (I/F) 50 connected through a bus 90.

In addition to the above configuration, the image processing apparatus 2 includes an engine 80 for implementing a scanner, a printer, and the like, and a display unit such as a liquid crystal display (LCD) 60 and an operation unit 70 including a keyboard connected through the I/F 50. Note that the server 4 may not include the engine 80, the LCD 60, and the operation unit 70.

The CPU 10 is a processor which controls an entire operation of the image processing apparatus 2. The RAM 20 is a volatile storage medium capable of high-speed reading and writing of data and is used as a work area when the CPU 10 processes data. The ROM 30 is a read-only non-volatile storage medium that stores programs such as firmware. The storage medium 40 is a nonvolatile storage medium capable of reading and writing data such as an HDD, and stores an operating system (OS), various control programs, application program (hereinafter referred to as application), and the like. The I/F 50 connects and controls the bus 90, various kinds of hardware components such as the LCD 60 and the operation unit 70, the network 3, and the like.

The LCD 60 is a user interface for allowing the user to confirm a state of the image processing apparatus 2 received through the I/F 50. The operation unit 70 includes the keyboard and the like and is a user interface for the user to input data to the image processing apparatus 2. Note that the LCD 60 and the operation unit 70 may be configured as a touch panel using a resistive film method, a surface acoustic wave method, a capacitance method, or the like as a principle of operation theory.

Figure 3:
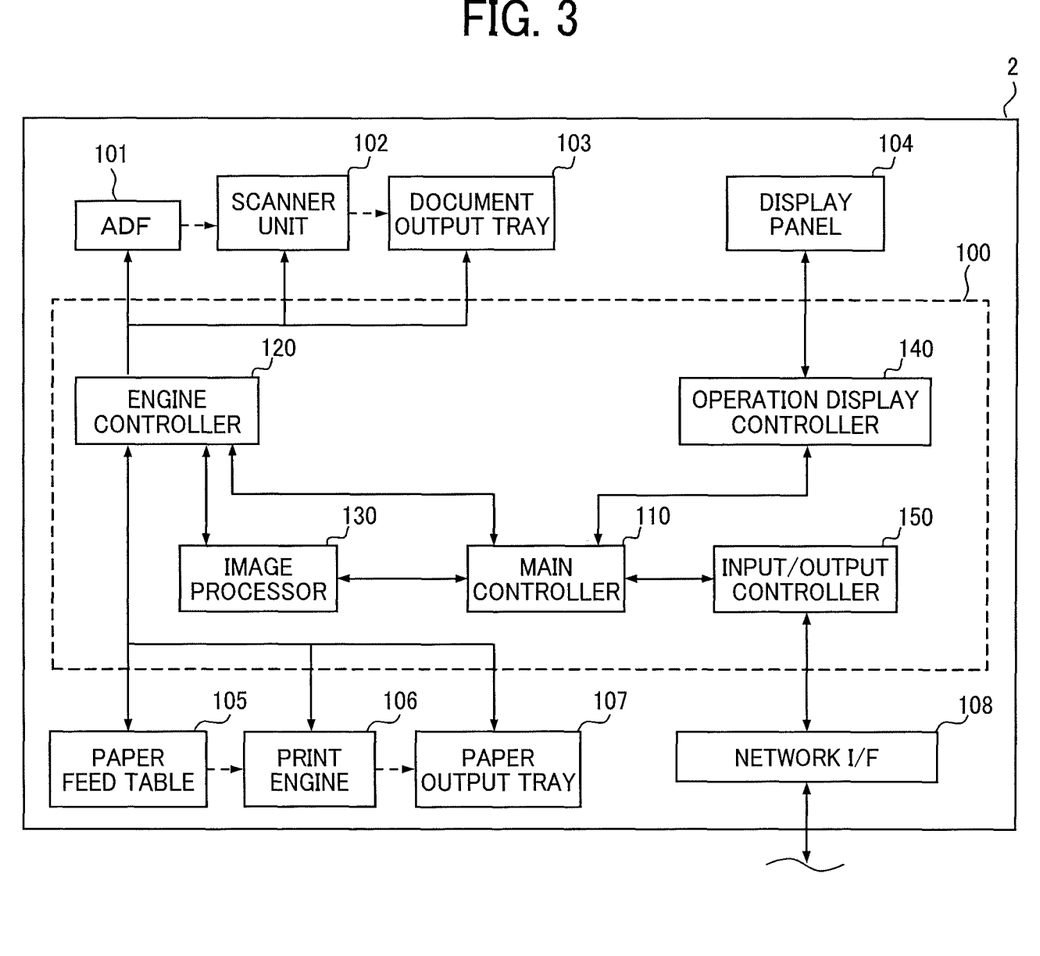
FIG. 3 is a block diagram illustrating a functional configuration of the image processing apparatus according to embodiments of the present disclosure.

With this hardware configuration, the functions of a controller 100 illustrated in FIG. 3 are implemented by the CPU 10 executing processing according to the program stored in the ROM 30 or the program read from the storage medium 40 to the RAM 20. A functional block for implementing the functions of the image processing apparatus 2 is configured by the combination of the internal functions of the controller 100 and the hardware components configured in this way.

With this hardware configuration, functions of a software controller in the server 4 are implemented by the CPU 10 executing processing according to the programs stored in a storage medium such as the ROM 30, the storage medium 40, or an optical disk read into the RAM 20. A functional block for implementing the function of the server 4 is constituted by a combination of the software controller configured in this way and the hardware components.

Hereinafter, the functional configuration of the image processing apparatus 2 according to the present embodiment is described with reference to FIG. 3. FIG. 3 is a block diagram illustrating a functional configuration of the image processing apparatus 2 according to the present embodiment. As illustrated in FIG. 3, the image processing apparatus 2 includes the controller 100, an automatic document feeder (ADF) 101, a scanner unit 102, a document output tray 103, a paper feed table 105, a print engine 106, a paper output tray 107, and a network I/F 108.

Further, the controller 100 includes a main controller 110, an engine controller 120, an image processor 130, an operation display controller 140, and an input/output controller 150. In FIG. 3, electrical connection is indicated by a solid arrow and a flow of document or document bundle is indicated by a broken line arrow.

The network I/F 108 is an interface for the image processing apparatus 2 to communicate with other apparatus through a network, and Ethernet (registered trademark) or universal serial bus (USB) interface is used. The network I/F 108 can communicate using the transmission control protocol/internet protocol (TCP/IP), and is implemented by the I/F 50 illustrated in FIG. 2.

The controller 100 is implemented by a combination of software and hardware. Specifically, a program that is stored in a nonvolatile memory such as the ROM 30 or a nonvolatile storage medium such as the storage medium 40 or an optical disc is loaded to a volatile memory such as the RAM 20. The CPU 10 executes processing according to the program loaded to the RAM 20 to implement the software controller. The controller 100 is implemented by a combination of the software controller and hardware components such as integrated circuits (IC). The controller 100 controls all operations of the image processing apparatus 2.

The main controller 110 controls each unit included in the controller 100 and gives an instruction to each unit of the controller 100. The engine controller 120 functions as a driver that controls or drives the print engine 106 or the scanner unit 102. The image processor 130 generates drawing data based on image data to be output for printing under control of the main controller 110. The drawing data is information used by the print engine 106, which functions as an image forming unit, to form an image on a recording sheet.

Further, the image processor 130 also processes captured data that is input from the scanner unit 102 to generate image data. The image data is information stored in the storage area of the image processing apparatus 2 as a result of a scanner operation and transmitted to other information processing terminal or storage device through the network I/F 108.

The operation display controller 140 displays information on a display panel 104 or notifies the main controller 110 of information input through the display panel 104. The input/output controller 150 inputs data input through the network I/F 108 to the main controller 110. Further, the main controller 110 controls the input/output controller 150 and accesses other devices connected to the network through the network OF 108 and the network.

When the image processing apparatus 2 operates as a printer, the input/output controller 150 receives a print job through the network I/F 108 first, which means that the input/output controller 150 functions as a print data acquisition unit. The input/output controller 150 transfers the received print job to the main controller 110. Upon receiving the print job, the main controller 110 controls the image processor 130 to generate drawing data based on document data or image data included in the print job.

When the drawing data is generated by the image processor 130, the engine controller 120 controls the print engine 106 to form image on the paper conveyed from the paper feed table 105 based on the generated drawing data, which means that the image processor 130, the engine controller 120, and the print engine 106 function as a print output unit.

As a specific form of the print engine 106, it is possible to use an image forming mechanism employing an inkjet method, an electrophotographic method, or the like. A document on which image has been formed by the print engine 106 is discharged to the paper output tray 107.

When the image processing apparatus 2 operates as a scanner, in response to the user's operation on the display panel 104 or a scan execution instruction input from an external apparatus through the network I/F 108, the operation display controller 140 or the input/output controller 150 transfers the scan execution instruction to the main controller 110. The main controller 110 controls the engine controller 120 based on the received scan execution instruction.

The engine controller 120 drives the ADF 101 to convey a document S of an imaging target set in the ADF 101 to the scanner unit 102 as described above. Further, the engine controller 120 drives the scanner unit 102 to scan the document conveyed from the ADF 101.

When a document is not set on the ADF 101 and the document is directly set on the scanner unit 102, the scanner unit 102 captures the image of the set document under the control of the engine controller 120, which means that the scanner unit 102 operates as an image capturing unit, and the engine controller 120 functions as a reading control unit.

In the imaging operation, an imaging element such as a charge coupled device (CCD) included in the scanner unit 102 optically scans the document, and captured data is generated based on the optical data. The engine controller 120 transfers the data captured by the scanner unit 102 to the image processor 130. Under the control of the main controller 110, the image processor 130 generates image data based on the captured data received from the engine controller 120.

The image data generated by the image processor 130 is acquired by the main controller 110, and the main controller 110 stores the image data in a storage medium attached to the image processing apparatus 2 such as the storage medium 40, which means that the scanner unit 102, the engine controller 120, and the image processor 130 cooperate to function as an image input unit. The image data generated by the image processor 130 is directly stored in the storage medium 40 or the like in response to an instruction from the user or is transmitted to an external device through the input/output controller 150 and the network I/F 108.

When the image processing apparatus 2 operates as a copier, the image processor 130 generates drawing data based on the captured data received from the scanner unit 102 by the engine controller 120 or the image data generated by the image processor 130. The engine controller 120 drives the print engine 106 based on the drawing data generated by the image processor 130 in substantially the same manner as described above in connection with the printing operation. When the data formats of the drawing data and the captured data are the same, the captured data can be used as the drawing data.

Figure 4:
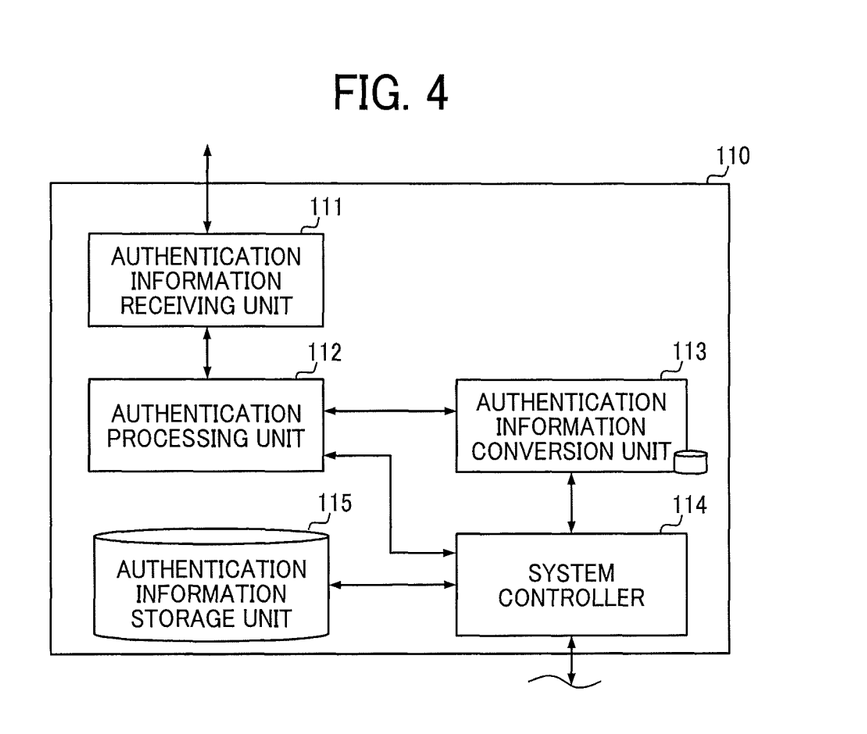
FIG. 4 is a block diagram illustrating a functional configuration of a main controller according to embodiments of the present disclosure.

The main controller 110 acquires information input by the user through the display panel 104 from the operation display controller 140 and executes an authentication process for enabling the use of various functions of the image processing apparatus 2 in the information processing system 1. FIG. 4 is a block diagram illustrating a functional configuration of the main controller 110 according to the present embodiment.

As illustrated in FIG. 4, the main controller 110 includes an authentication information receiving unit 111, an authentication processing unit 112, an authentication information conversion unit 113, a system controller 114, and an authentication information storage unit 115. The authentication information receiving unit 111 receives authentication information such as a user ID and a password input by the user through the display panel 104 and transmits a login request to the image processing apparatus 2.

When the user ID and the password are stored in an IC card or the like, the authentication information receiving unit 111 may be configured to cause the user to bring the IC card to a card recognition device and receive the recognized user ID and password from the card recognition device through the network I/F 108.

Note that the login request is a process to identify users who are permitted to execute, for example, printing, transmission, and reception of high-security information, among the functions installed in the image processing apparatus 2, by using the user ID and the password.

Therefore, even users who are not logged in the image processing apparatus 2 can use functions such as copying and scanning. However, unless the user logs in to the image processing apparatus 2, for example, it is not possible to use the function of storing captured data obtained by scanning in the server 4.

The authentication processing unit 112 executes authentication processing for making the image processing apparatus 2 usable by using the authentication information received by the authentication information receiving unit 111.

Figure 5:
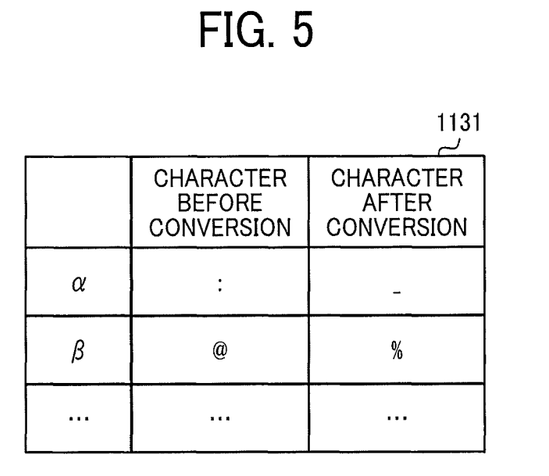
FIG. 5 is a diagram illustrating a character conversion table according to embodiments of the present disclosure.

The authentication information conversion unit 113 stores a character conversion table 1131 as illustrated in FIG. 5, converts the authentication information received by the authentication information receiving unit 111 based on an instruction from the authentication processing unit 112, and generates readable authentication information.

The character conversion table 1131 is a data table that the authentication information conversion unit 113 refers to when converting the authentication information received by the authentication information receiving unit 111, and a character before conversion and a character after conversion are associated with each other.

As illustrated in FIG. 5, the characters before conversion and the characters after conversion are associated so as not to overlap. The authentication information conversion unit 113 converts ":" included in the authentication information received by the authentication information receiving unit 111 into "_" and converts "@" included in the authentication information received by the authentication information receiving unit 111 into "%".

Furthermore, based on the instruction from the authentication processing unit 112, the authentication information conversion unit 113 converts the readable authentication information into the authentication information before conversion, that is, the authentication information received by the authentication information receiving unit 111, using the character conversion table 1131.

The system controller 114 functions as a processing control unit that controls execution of authentication processing in the image processing apparatus 2. A character which can be used in processing the authentication information in the image processing apparatus 2 is the character which can be processed by the system controller 114.

Conversion rules are defined based on whether or not a character that cannot be interpreted by the system controller 114 is included in the characters constituting authentication information. The "character that cannot be interpreted" in this embodiment refers to a character that cannot be processed by the system controller 114.

By executing the authentication process in the image processing apparatus 2, the authentication information storage unit 115 stores the authentication information of a user 6 who has been authenticated to use the image processing apparatus 2. The authentication information stored in the authentication information storage unit 115 is the user ID and the password of the user 6.

Figure 6:
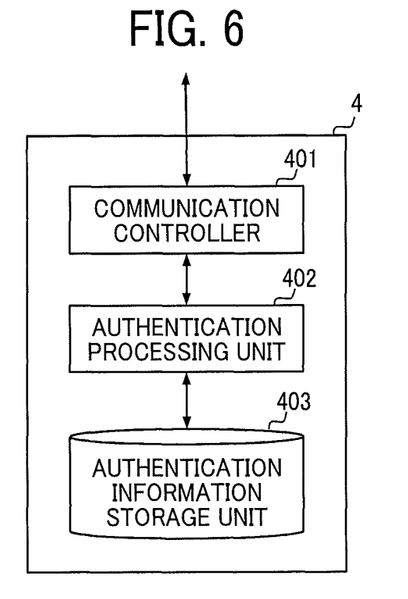
FIG. 6 is a block diagram illustrating a functional configuration of a server according to embodiments of the present disclosure.

Hereinafter, the functional configuration of the server 4 according to the present embodiment is described with reference to FIG. 6. FIG. 6 is a block diagram illustrating a functional configuration of the server 4 according to the present embodiment. As illustrated in FIG. 6, the server 4 includes a communication controller 401, an authentication processing unit 402, and an authentication information storage unit 403.

The communication controller 401 controls data input to and output from the server 4 through the network 3. When the authentication processing unit 402 receives the authentication request of the user 6 from the image processing apparatus 2, the authentication processing unit 402 executes authentication processing based on the authentication information stored in the authentication information storage unit 403. In the present embodiment, the server 4 functions as an authentication apparatus.

The authentication information storage unit 403 stores the user ID and password of the user 6 who is permitted to use the information processing system 1.

When the authentication information received from the image processing apparatus 2 is stored in the authentication information storage unit 403, the authentication processing unit 402 determines that the user 6 identified by the authentication information has been authenticated at the server 4.

With such a configuration, the information processing system 1 according to the present embodiment receives an input of the user ID and the password from the user 6 and executes the authentication processing to enable the use of various functions mounted in the image processing apparatus 2.

Figure 7:
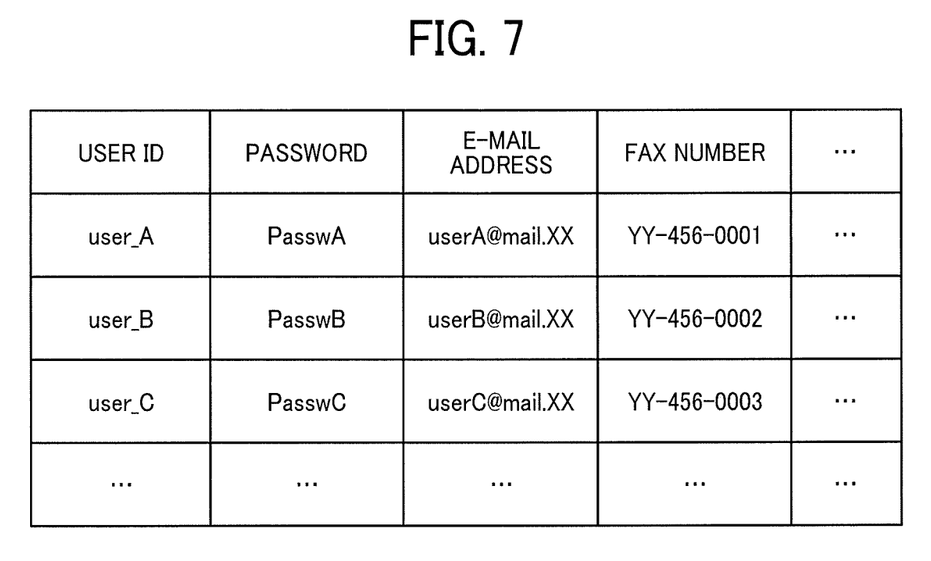
FIG. 7 is a diagram illustrating authentication information stored in the image processing apparatus according to embodiments of the present disclosure.

In the present embodiment, when using the image processing apparatus 2, authentication processing is executed based on the authentication information stored in the authentication information storage unit 115. FIG. 7 is a diagram illustrating an example of the authentication information stored in the authentication information storage unit 115.

As illustrated in FIG. 7, the authentication information of the user 6 ("user_A", "PasswA", "userA@mail.XX", "YY-456-0001") is stored in the authentication information storage unit 115.

Here, it is assumed that ":" cannot be used for processing the authentication information in the image processing apparatus 2A, which means that in the image processing apparatus 2A, a character string including ":" cannot be interpreted as control data.

Figure 8:
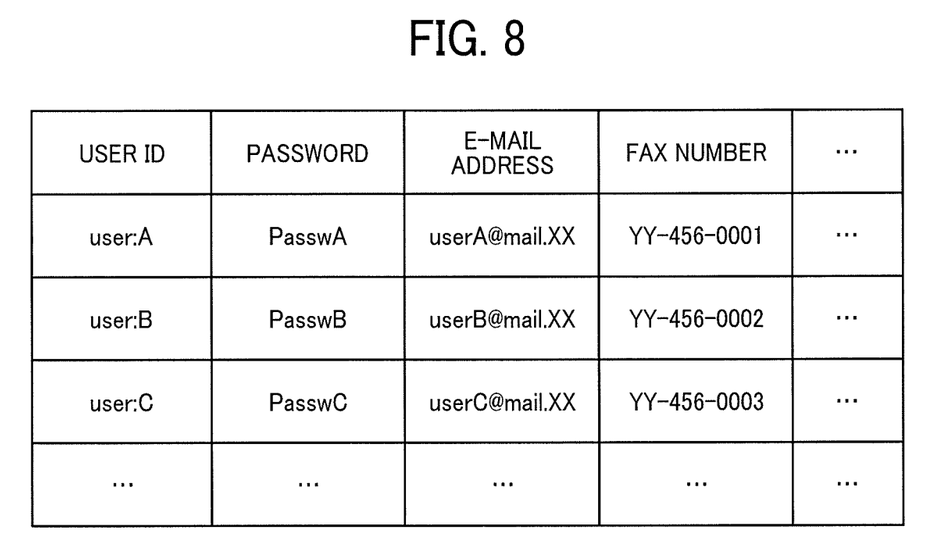
FIG. 8 is a diagram illustrating authentication information stored in the server according to embodiments of the present disclosure.

On the other hand, when using the information processing system 1, the server 4 executes authentication processing based on the authentication information stored in the authentication information storage unit 403. FIG. 8 is a diagram illustrating an example of the authentication information stored in the authentication information storage unit 403.

As illustrated in FIG. 8, the authentication information of the user 6 ("user:A", "PasswA", "userA@mail.XX", "YY-456-0001") is stored in the authentication information storage unit 403.

Therefore, when the authentication processing of the user 6 is executed in the server 4 and the authentication information of the user 6 stored in the authentication information storage unit 403 is used as the authentication information for the image processing apparatus 2A, the image processing apparatus 2A cannot interpret "user:A".

As described with reference to FIG. 7 and FIG. 8, in the image processing apparatus 2A and the server 4, there are cases where characters that can be used for processing the authentication information are different. In such a case, as described above, since the authentication information of the user 6 stored as the authenticated user of the information processing system 1 in the server 4 cannot be interpreted by the image processing apparatus 2A, the authentication processing of the user 6 cannot be executed.

In the present embodiment, in such a case, by converting the authentication information of the user 6 authenticated for the information processing system 1 into a format that can be interpreted by the image processing apparatus 2, authentication processing of the user 6 in the image processing apparatus 2 can be executed.

Figure 9A:
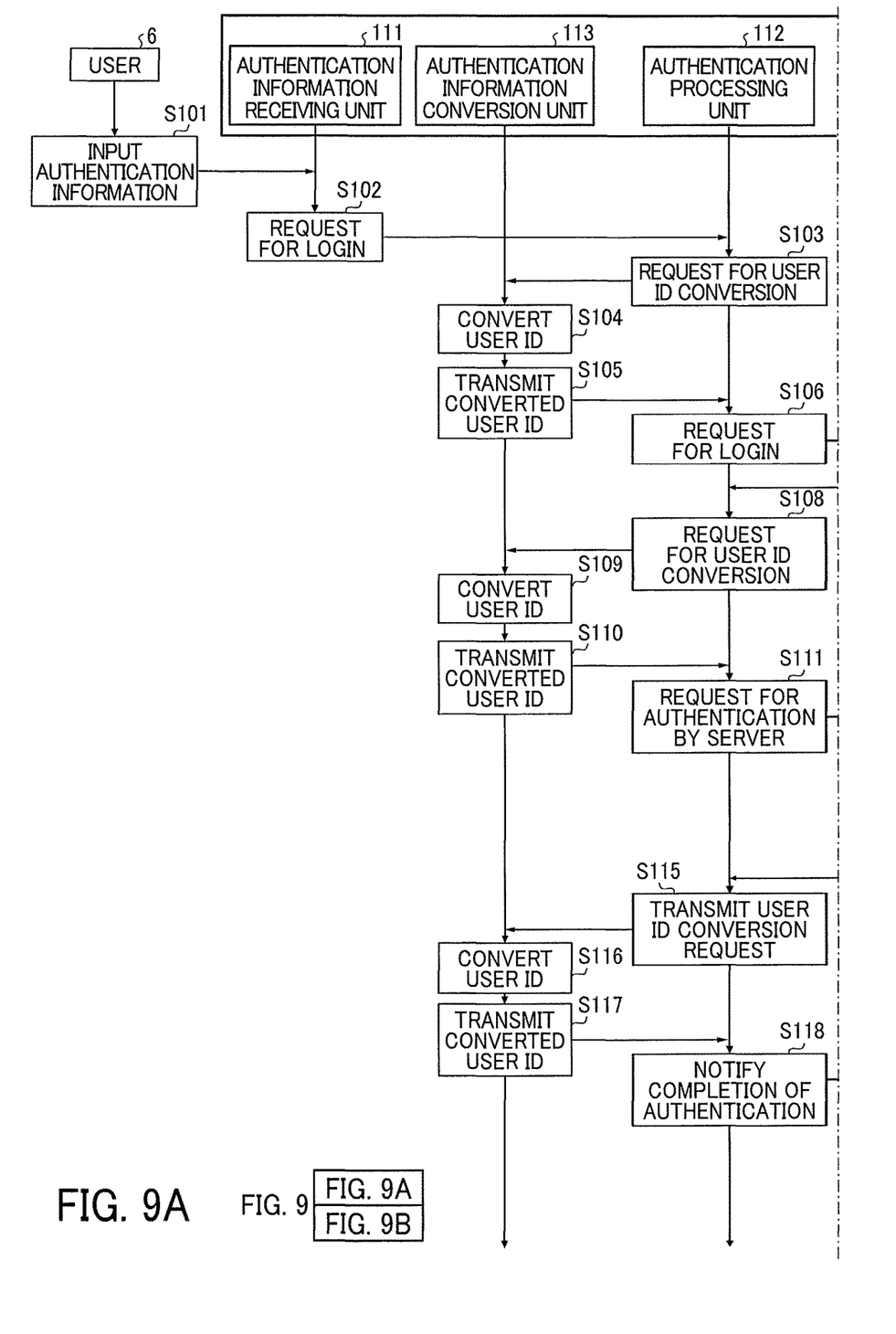
FIG. 9A and FIG. 9B are sequence diagrams illustrating an authentication processing according to embodiments of the present disclosure.
Figure 9B:
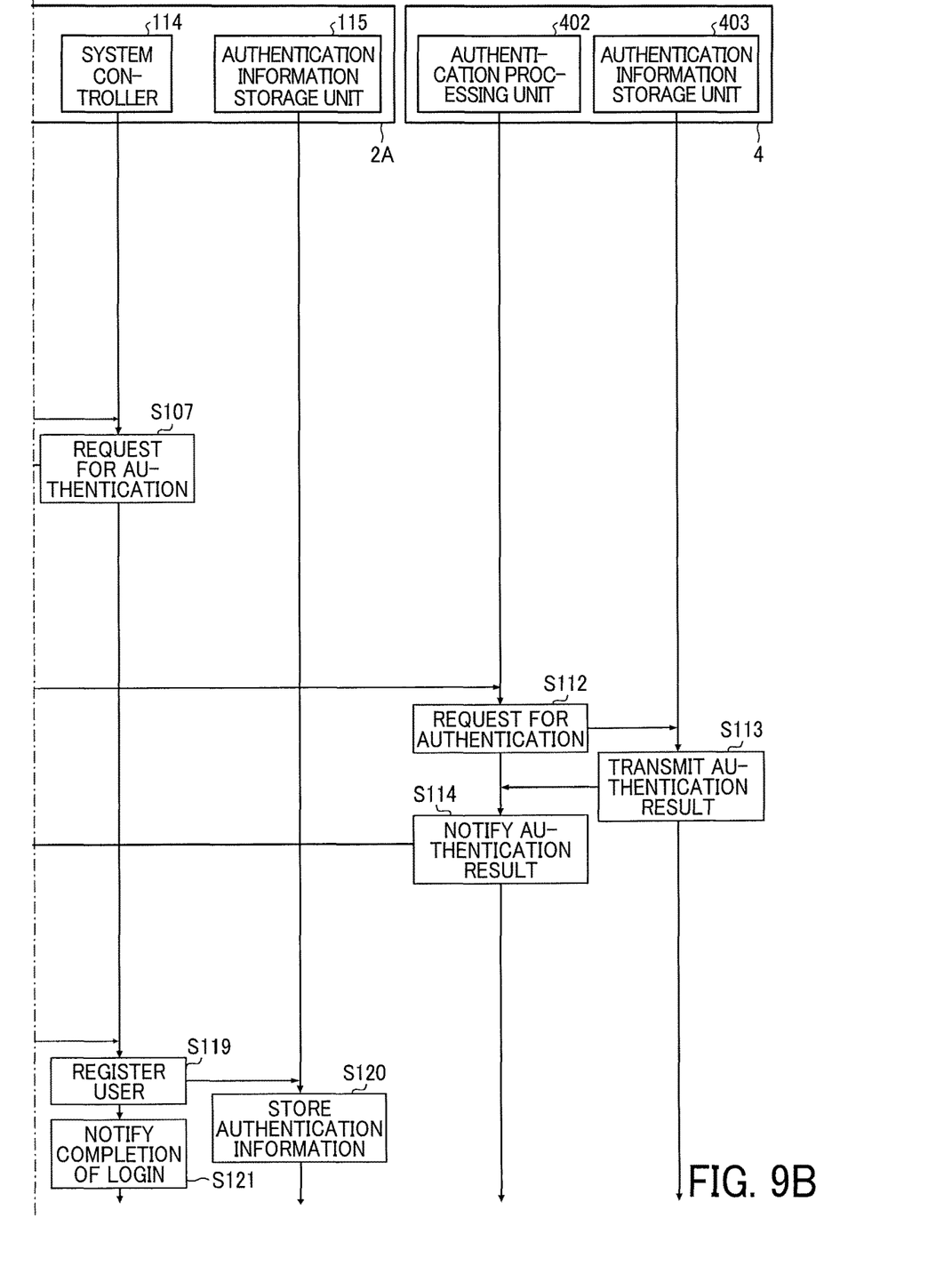

Hereinafter, authentication processing in the information processing system 1 according to the present embodiment is described with reference to FIG. 9A and FIG. 9B. FIG. 9A and FIG. 9B are sequence diagrams illustrating the authentication processing according to the present embodiment.

In the sequence diagram illustrated in FIG. 9A and FIG. 9B, processing up to logging in to the image processing apparatus 2A by inputting the user ID and the password from the display panel 104 of the image processing apparatus 2A, when the user 6 intends to use the information processing system 1 is described.

In step S101, the user 6 inputs a user ID which is identification information of the user 6 from the display panel 104 and a password associated with the user ID. In the present embodiment, the user ID and the password are used as authentication information for performing the authentication process.

The authentication information input by the user 6 on the display panel 104 is transmitted to the authentication information receiving unit 111 through the operation display controller 140. Upon receiving the authentication information, the authentication information receiving unit 111 transmits a login request to the authentication processing unit 112 in step S102.

In step S103, the authentication processing unit 112 transmits a user ID conversion request together with the authentication information to the authentication information conversion unit 113. At this time, for example, even when the user ID does not include a character that cannot be interpreted by the system controller 114, the authentication processing unit 112 transmits the user ID conversion request.

In step S104, the authentication information conversion unit 113 refers to the character conversion table 1131 and converts the user ID included in the authentication information received from the authentication processing unit 112. When the user ID includes the character that cannot be interpreted by the system controller 114, the authentication information conversion unit 113 converts the user ID to include only the character that can be interpreted by the system controller 114 in the process of step S104. Note that the characters that can be interpreted are preset.

The authentication information conversion unit 113 may be configured to temporarily store information indicating which character has been converted among the characters included in the user ID in association with the user ID before conversion. At this time, the authentication information conversion unit 113 temporarily stores the conversion of the user ID of the user 6 with reference to the table of "a" in the character conversion table 1131, for example.

In step S105, the authentication information conversion unit 113 transmits the converted user ID to the authentication processing unit 112. Upon receiving the converted user ID, the authentication processing unit 112 transmits the login request to the system controller 114 in step S106, to login to the image processing apparatus 2A.

In this embodiment, only a user who has been authenticated by the server 4 can log in to the image processing apparatus 2A. Therefore, the system controller 114, upon receiving the login request, transmits the authentication request by the server 4 to the authentication processing unit 112 in step S107.

Upon receiving the authentication request, the authentication processing unit 112 transmits a conversion request of the user ID together with the authentication information to the authentication information conversion unit 113 in step S108. At this time, the user ID transmitted to the authentication information conversion unit 113 is the user ID converted into the character that can be interpreted by the system controller 114 by the processing of step S104, or the user ID which does not include character that cannot be interpreted by the system controller 114.

In step S109, the authentication information conversion unit 113 converts the user ID included in the authentication information received from the authentication processing unit 112, with reference to the character conversion table 1131. In step S108, if the system controller 114 received the user ID converted into the character that can be interpreted by the process of S104, the user ID is converted into a user ID including the characters that cannot be interpreted by the system controller 114 in step S109.

In step S110, the authentication information conversion unit 113 transmits the converted user ID to the authentication processing unit 112. Upon receiving the converted user ID, the authentication processing unit 112 transmits an authentication request together with authentication information including the converted user ID to the server 4 through the input/output controller 150 in step S111.

Upon receiving the authentication request from the image processing apparatus 2A, the authentication processing unit 402 of the server 4 determines whether or not the authentication information is stored in the authentication information storage unit 403 in step S112. In step S113, the authentication information storage unit 403 transmits a result of whether or not the authentication information received from the authentication processing unit 402 is stored in the authentication information storage unit 403 to the authentication processing unit 402.

In step S114, when the received authentication information is stored in the authentication information storage unit 403, the authentication processing unit 402 notifies the image processing apparatus 2A that the user 6 identified by the authentication information has been authenticated by the server 4, and when the received authentication information is not stored in the authentication information storage unit 403, the authentication processing unit 402 notifies that the user 6 identified by the authentication information cannot be authenticated by the server 4.

Regarding the processes after step S115, it is assumed that the user 6 identified by the authentication information has been authenticated by the server 4. When the user 6 identified by the authentication information is authenticated by the server 4, the authentication processing unit 112 transmits the user ID conversion request together with the authentication information to the authentication information conversion unit 113 in step S115.

In step S116, the authentication information conversion unit 113 converts the user ID included in the authentication information received from the authentication processing unit 112 referring to the character conversion table 1131. When the user ID includes the character that cannot be interpreted by the system controller 114, the user ID is converted to include only the character that can be interpreted by the system controller 114 in the processing of step S116.

In step S117, the authentication information conversion unit 113 transmits the converted user ID to the authentication processing unit 112. Upon receiving the converted user ID, the authentication processing unit 112 transmits the authentication information including the converted user ID and notifies the system controller 114 that the authentication processing by the server 4 is completed in step S118.

In step S119, the system controller 114 registers the user by storing the authentication information received in S118 in the authentication information storage unit 115. In step S120, the authentication information storage unit 115 stores the authentication information received from the system controller 114. The user 6 identified based on the identification information stored in the authentication information storage unit 115 can use a high-security function installed in the image processing apparatus 2A.

In step S121, when the authentication information is stored in the authentication information storage unit 115, the system controller 114 displays a screen notifying the completion of login processing of the user 6 on the display panel 104 through the operation display controller 140 and ends the series of processes.

When the user 6 inputs the authentication information from the display panel 104, the user 6 may input a character string including the character that cannot be interpreted by the system controller 114 as the user ID.

Figure 10A:
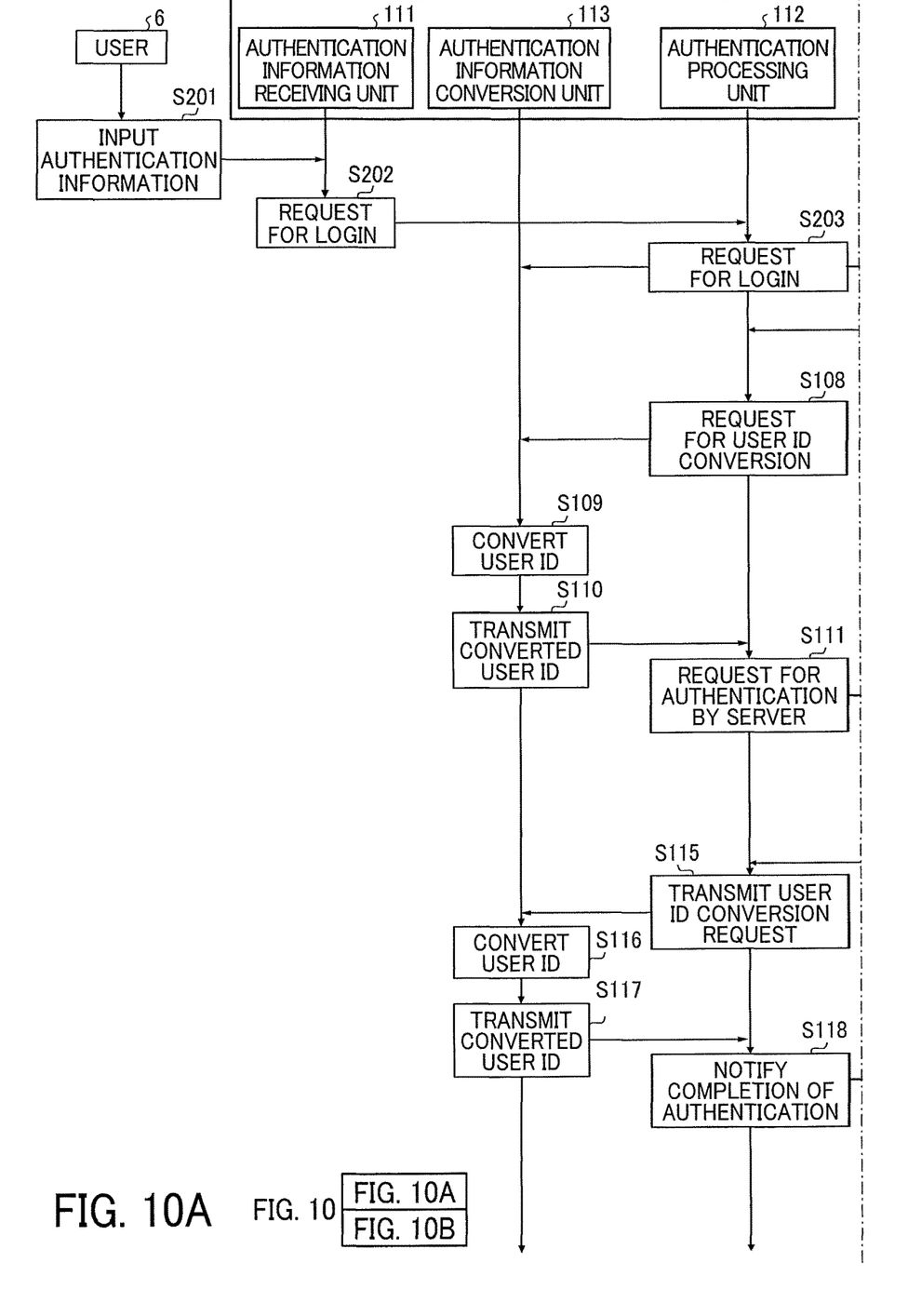
FIG. 10A and FIG. 10B are sequence diagrams illustrating the authentication processing according to embodiments of the present disclosure.
Figure 10B:
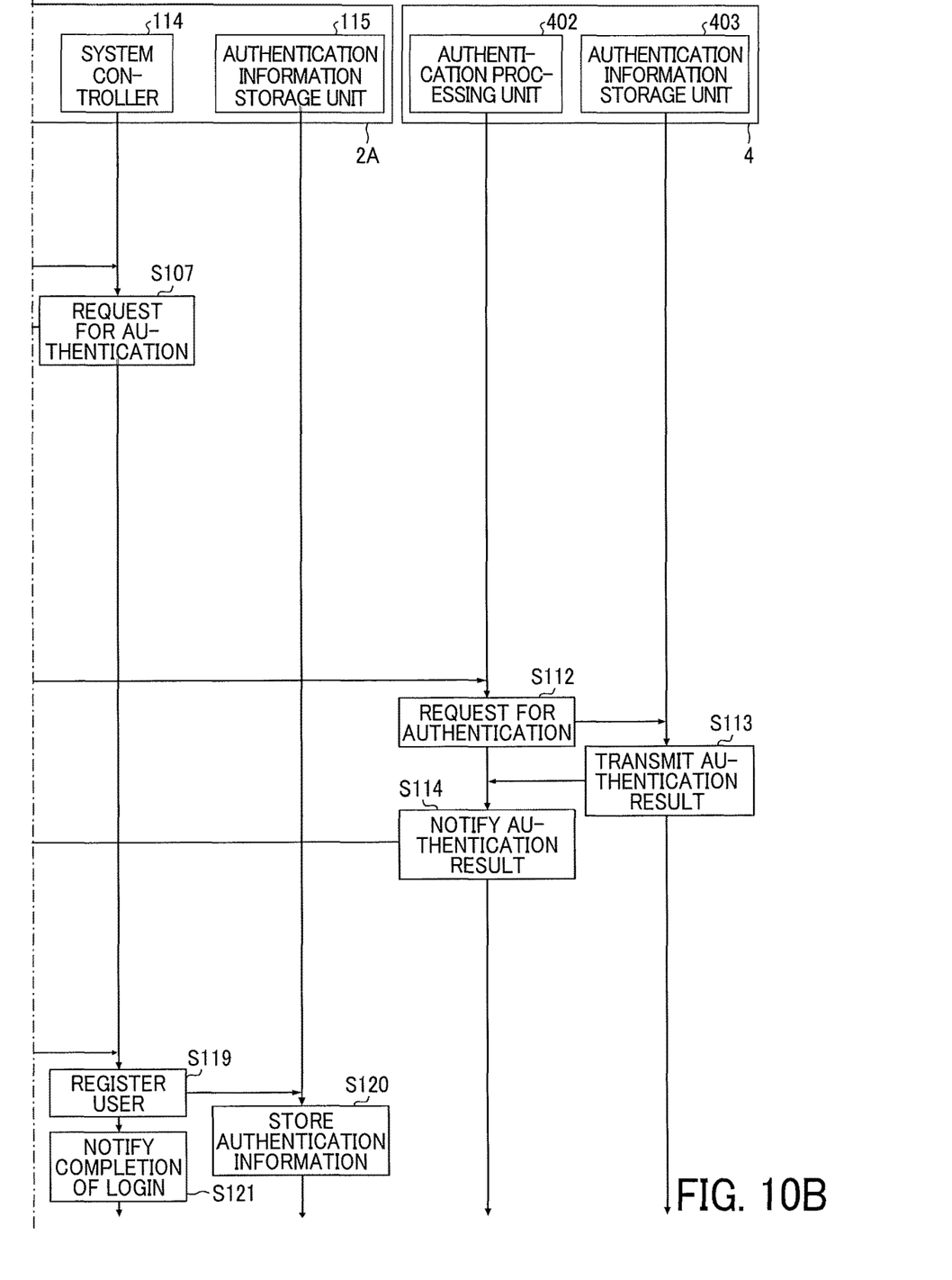

In a sequence diagram illustrated in FIG. 10A and FIG. 10B, a process when the authentication information input from the display panel 104 does not include the character that cannot be interpreted by the system controller 114 in the user ID, which means that the user 6 replaced the character that cannot be interpreted by the system controller 114 with the character that can be interpreted by the system controller 114, is described. In the process illustrated in FIG. 10A and FIG. 10B, the same reference numbers are given to the same steps as in FIG. 9A and FIG. 9B, and duplicated descriptions are omitted.

In step S201, the user 6 inputs a user ID which is identification information capable of identifying the user 6 from the display panel 104 and a password associated with the user ID.

At this time, the system controller 114 requests the user 6 to replace the character that cannot be interpreted with the character that can be interpreted. Therefore, in the process of S201, the user 6 inputs authentication information constituted by replacing the character that cannot be interpreted by the system controller 114 with the character that can be interpreted by the system controller 114.

The authentication information input by the user 6 on the display panel 104 is transmitted to the authentication information receiving unit 111 through the operation display controller 140. Upon receiving the authentication information, the authentication information receiving unit 111 transmits a login request to the authentication processing unit 112 in step S202.

When the authentication processing unit 112 receives the authentication information formed by converting the character that cannot be interpreted by the system controller 114 into the character that can be interpreted by the system controller 114, the authentication processing unit 112 sends the login request for the image processing apparatus 2A to the system controller 114 in step S203. Since the process after step S203 includes the same process as that after step S107 in FIG. 9B, duplicated explanation is omitted.

As described above, in the present embodiment, the authentication information of the user 6 who is permitted to use the information processing system 1 is converted into a format that can be processed by the image processing apparatus 2A. Then, the image processing apparatus 2A executes login processing using the converted authentication information, and on the other hand, the server 4 performs authentication processing by using the authentication information which is not converted.

By doing so, even when the r rules governing the characters that can be used for processing the authentication information are different for the image processing apparatus 2 and the server 4, the authentication processing of the information processing system 1 and the authentication processing of the image processing apparatus 2 can be executed by inputting the authentication information once. Therefore, in the information processing system to which the present disclosure is applied, it is possible to improve the convenience in performing the authentication process.

When the user ID includes the character converted by the authentication information conversion unit 113, the user ID required for performing authentication processing for the server 4 is composed of the character different from the original user ID. Therefore, according to the present embodiment, it is necessary to configure the user ID so that the characters converted by the authentication information conversion unit 113 are not included in the user ID before conversion.

Figure 11:
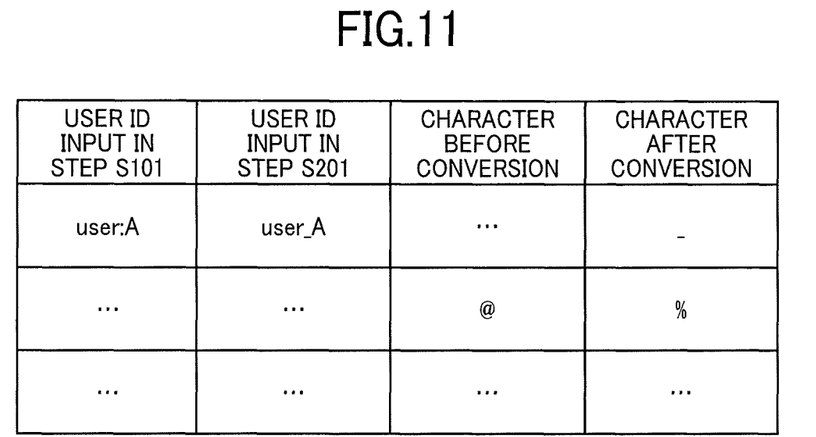
FIG. 11 is a diagram illustrating a configuration of a user identification (ID) before and after conversion according to embodiments of the present disclosure.

Therefore, the user ID input by the user 6 is configured not to include, for example, characters "_" or "%", which are converted characters among the characters illustrated in FIG. 11. When the user 6 inputs "user:A_" as a user ID in step S101, the user ID is converted to "user_A_" in step S104 and converted to "user_A_" in step S109.

In such a case, since the authentication processing unit 402 of the server 4 executes the authentication using the user ID "user_A_", the user ID input by the user 6 in step S101 cannot include the characters converted by the authentication information conversion unit 113.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
processing circuitry configured to:
receive, as authentication information, identification information of a user of an information processing system, the information processing system including the information processing apparatus and an authentication apparatus;
convert the authentication information to form readable authentication information by converting a first character that cannot be interpreted by the information processing apparatus into a second character that can be interpreted by the information processing apparatus; and
execute an authentication process to enable use of the information processing apparatus based on the readable authentication information, when the authentication process to enable use of the information processing system is executed by the authentication apparatus based on the authentication information,
wherein the processing circuitry is further configured to convert the readable authentication information to the authentication information received by the information processing apparatus.

2. The information processing apparatus of claim 1, wherein the processing circuitry is further configured to convert the second character that can be interpreted included in the readable authentication information into the first character that cannot be interpreted included in the authentication information.

3. The information processing apparatus of claim 1, wherein the processing circuitry is further configured to convert the first character that cannot be interpreted into the second character that can be interpreted based on a data table in which the first character that cannot be interpreted and the second character that can be interpreted are stored in association with each other.

4. The information processing apparatus of claim 1, wherein the processing circuitry is further configured to store, in a memory, the first character, which has been converted to form the readable authentication information, in association with the identification information.

5. The information processing apparatus of claim 1, wherein the processing circuitry is further configured to:
  convert the readable authentication information including the second character that can be interpreted into the authentication information including the first character that cannot be interpreted, when the readable authentication information is received; and
  execute the authentication process to enable the use of the information processing apparatus based on the readable authentication information, when the authentication process is executed in the authentication apparatus to enable the use of the information processing system based on the converted authentication information.

6. The information processing apparatus of claim 1, wherein the processing circuitry is further configured to convert the first character that cannot be interpreted included in the identification information into the second character that can be interpreted.

7. An authentication method performed using an information processing apparatus, the method comprising:
  receiving authentication information of a user;
  converting a character that cannot be interpreted by an information processing apparatus into a character that can be interpreted by the information processing apparatus, when the authentication information includes the character that cannot be interpreted by the information processing apparatus;
  executing an authentication process based on the converted authentication information;
  converting the converted authentication information into the authentication information before conversion;
  transmitting the authentication information before conversion to an authentication apparatus;
  receiving a result of authentication for the transmitted authentication information before conversion from the authentication apparatus; and
  indicating completion of authentication based on the result of authentication.

* * * * *